US007106546B2

(12) United States Patent
Galbiati

(10) Patent No.: US 7,106,546 B2
(45) Date of Patent: Sep. 12, 2006

(54) SYSTEM FOR CONTROLLING THE SPEED OF A VOICE COIL MOTOR (VCM) IN ORDER TO PROVIDE A LOW NOISE RAMP LOADING OF A HARD DISK HEAD

(75) Inventor: Ezio Galbiati, Agnadello (IT)

(73) Assignee: STMicroelectronics S.R.L., (IT)

( * ) Notice: Subject to any disclaimer, the term of this patent is extended or adjusted under 35 U.S.C. 154(b) by 0 days.

(21) Appl. No.: 11/019,937

(22) Filed: Dec. 21, 2004

(65) Prior Publication Data
US 2005/0157418 A1  Jul. 21, 2005

(30) Foreign Application Priority Data
Dec. 31, 2003 (IT) .......................... MI2003A2629

(51) Int. Cl.
*G11B 21/02* (2006.01)

(52) U.S. Cl. ........................................ 360/75
(58) Field of Classification Search ............... None
See application file for complete search history.

(56) References Cited

U.S. PATENT DOCUMENTS 6,950,272 B1 * 9/2005 Rice et al. ............... 360/78.06

* cited by examiner

*Primary Examiner*—Hoa T. Nguyen
*Assistant Examiner*—Mitchell Slavitt
(74) *Attorney, Agent, or Firm*—Jenkens & Gilchrist, PC

(57) ABSTRACT

A system controls the speed of a Voice Coil Motor (VCM) in order to perform the ramp loading of hard disk heads with low noise. This system includes a generator for generating a discontinuous PWM drive signal to a power stage. A sampling block is clocked by a synchronization signal issued from the generator and receives as an input a signal related to the electromotive force (Bemf) provided by the VCM motor. An adder node placed at the sampling block output receives a signal related to a reference electromotive force (Bemf_ref). A filtering block placed downstream of the adder node generates a power supply voltage signal to the power stage. The control system further includes a control block having at least one voltage divider and controlled switches. The control block is input the signal issued from the filtering block and control signals from the generator block to selectively operate the controlled switches and set the value of the power-on signal of the power stage.

30 Claims, 7 Drawing Sheets

SYSTEM FOR CONTROLLING THE SPEED OF A VOICE COIL MOTOR (VCM) IN ORDER TO PROVIDE A LOW NOISE RAMP LOADING OF A HARD DISK HEAD

PRIORITY CLAIM

This application claims priority from Italian Application Patent No. MI2003A002629 filed Dec. 31, 2003, the disclosure of which is hereby incorporated by reference.

BACKGROUND OF THE INVENTION

1. Technical Field of the Invention

The present invention relates to a system for controlling the speed of a Voice Coil Motor (VCM) in order to perform a low-noise ramp loading of Hard Disk heads.

2. Description of Related Art

As is well known in this specific technical field, a Voice Coil Motor (VCM) is a special type of motor operative to move a read/write head in small steps across a magnetic disk, the extent of the movements being controlled by the electromotive force of a coil. The initials VCM will be used herein for brevity to denote a Voice Coil Motor.

It is common to provide the drive for a power stage controlling the speed of a VCM in a discontinuous pulse width modulation (PWM) mode. Pulse Width Modulation will be designated PWM herein for brevity. This operation mode is used by reason of it being simple and demanding no calibration.

The state of the art provides a number of solutions to the problem of feedback driving motors as above by PWM signals. Relevant references are, for instance, Patents Nos. U.S. Pat. No. 6,542,324 B1, EP 1,118,994 A2, U.S. Pat. No. 6,320,717 B1, and U.S. Pat. No. 6,363,214 B1, the disclosures of each which being incorporated herein by reference.

The above-mentioned and other patent references provide the same circuit type, to be generally discussed below with reference to FIGS. 1, 2 and 3a.

Shown in FIG. 1 is a block diagram of a speed control system for a VCM motor 1.

The system of FIG. 1 includes a discontinuous PWM signal generator 2 operative to generate an enable signal $IN_{ONOFF}$ to a power stage 3; this stage includes two power transistors TR1 and TR2 having gains K and −K, respectively, and being both supplied the same power supply signal $IN_{FIL}$.

The stage 3 outputs drive signals Out_M and Out_P to the winding of the VCM motor 1, through which motor a current $I_{VCM}$ flows. A current sensor, for example, in the form of a sensing resistor Rsense is connected in series with the winding of the motor 1.

The difference in value between the two output signals Out_M and Out_P sets the value of the electromotive force Bemf issued from the stage 3, when the output stage is in the tristate condition and there is no current. Both signals Out_M and Out_P are taken to the inverting (−) and non-inverting (+) terminals, respectively, of an operational amplifier 6, the latter supplying a signal $OUTR_{AM}$ to power a Sample and Hold sampling block 4. The block 4 receives a synchronization signal $IN_{SH}$ from the generator 2 for synchronizing the reading of the electromotive force Bemf from the VCM motor 1 with the frequency of the PWM signal generated by the generator 2; it comprises basically a switch SW which is driven by the signal $IN_{SH}$, and an output capacitor C1. The block 4 is connected to an adder node 7, to which it supplies a signal $OUT_{SH}$; the value of $OUT_{SH}$ is compared, by means of the adder node 7, to a reference electromotive force value Bemf_ref, thereby to produce an input signal IN+ to a filtering block 5. The filtering block 5 basically comprises a feedback amplifier 8 in an inverting configuration, which amplifier is input a reference voltage value Vref through its non-inverting (+) terminal, and the signal In+ issued from the adder node 7 through its inverting (−) terminal; the filtering block 5 filters and amplifies the signal IN+and supplies the power stage 3.

It can be appreciated from the above example that, during the operations for disk loading or ramp loading the heads, the speed of the VCM motor 1 is controlled by a direct reading of the electromotive force Bemf generated by the movement of the VCM motor 1 itself. In fact, during a time period when the power stage 3 is enabled (in the Current or in the Voltage mode), a current $I_{VCM}$ flows throughout the VCM motor 1 which will generate a suitable torque to keep the speed under control, whereas during a subsequent time period, the power stage 3 will be cut off by a high impedance Rsense (tristate condition) to allow the current flowing throughout the VCM motor 1 to be discharged, and upon completion of the discharging step, the generated electromotive force Bemf to be detected.

The differential amplifier 6 connected to the two outputs Out_M and Out_P then reads the electromotive force Bemf representing the feedback signal of the speed control cycle of the VCM motor 1.

Unfortunately, a side effect of this driving mode is that acoustical noise is generated during the aforesaid ramp loading operations, due to the low working frequency of the discontinuous PWM drive.

In addition, the intensity of this noise can vary according to the frequency of the PWM signal generated, the mechanical characteristics of the hard disk, or the amount of the current $I_{VCM}$ required for keeping the VCM motor speed under control.

Shown in FIG. 2 is a timing diagram illustrating how the power-on signal $IN_{ONOFF}$ and synchronization signal $IN_{SH}$ are linked with the two output voltage signals Out_P and Out_M of the power stage 3 and with the current $I_{VCM}$ flowing throughout the VCM motor 1.

It can be seen on the diagram that the electromotive force Bemf is detected at the end of the cut-off time period of the power stage 3, when the differential voltage at the two outputs of the power stage exactly matches the electromotive force Bemf generated by the movement of the VCM motor 1.

Also, during the enable time period (Ton) of the power stage 3, the current $I_{VCM}$ through the VCM motor 1 shows a step-wise pattern, specifically at its trailing edge.

FIG. 3a shows a current profile as detected in a prior art application. It can be seen from FIG. 3a that during the enable time period (Ton) of the power stage 3, no control is performed on the profile of the current $I_{VCM}$ flowing throughout the VCM motor 1.

Unfortunately, the current profile generated by prior art systems during the enable time period (Ton) is a major cause of the acoustical noise which is inherent to the drive arrangement discussed above.

There is accordingly a need to provide a system for controlling the speed of a VCM motor, specifically during the ramp loading of hard disk heads, with suitable design and performance features to still permit driving in the discontinuous PWM mode, but with a significant reduction in the acoustical noise caused by the loading operation, thereby overcoming the limitations of current systems according to the prior art.

SUMMARY OF THE INVENTION

In accordance with an embodiment of the invention, a system controls the speed of a voice coil motor (VCM) by means of a power stage which is driven in a discontinuous PWM (Pulse Width Modulation) mode of operation. The power stage of the system is driven such that the profile of the current flowing throughout the VCM motor can be kept under control and shaped to minimize the inherent acoustical noise of the system.

More specifically, an embodiment of the invention relates to a control system which comprises a generator for generating a discontinuous PWM drive signal to a power stage. A sampling block is clocked by a synchronization signal issued from the generator. A signal related to the electromotive force provided by the VCM motor is input and an adder node placed at the sampling block output receives a signal related to a reference electromotive force. A filtering block placed downstream of the adder node generates a power supply voltage signal to the power stage.

In accordance with an embodiment of the invention, a circuit is provided for driving a voice coil motor. A first drive amplifier is connected to a first terminal of the voice coil motor, and a second drive amplifier is connected to a second terminal of the voice coil motor, wherein the first and second drive amplifiers operate to supply a drive current through the voice coil motor. A supply circuit is operable to supply a voltage signal to the first and second drive amplifiers such that an amplitude of the drive current through the voice coil motor has a profile that is substantially half-sinusoidal.

In accordance with another embodiment, a circuit is provided for driving a voice coil motor. A first drive amplifier is connected to a first terminal of the voice coil motor, and a second drive amplifier connected to a second terminal of the voice coil motor, wherein the first and second drive amplifiers operate to supply a drive current through the voice coil motor. A supply circuit is operable to supply a voltage signal to the first and second drive amplifiers such that an amplitude of the drive current through the voice coil motor has a profile that includes a curved rise time and a curved fall time.

In accordance with another embodiment, a system is presented for driving a Voice Coil Motor (VCM) with low noise. A power stage for the VCM receives a voltage signal and generates a drive current through the VCM. A control block including a voltage divider circuit and a plurality of controlled switches receives a drive reference voltage and a plurality of switch control signals. The control block is operable to selectively actuate the controlled switches so as to choose voltage taps of the voltage divider circuit and output the voltage signal to the power stage such that the drive current through the VCM has a noise reducing profile. This noise reducing profile may comprise a substantially half-sinusoidal profile. This noise reducing profile may comprise a profile with a curved rise time and a curved fall time.

BRIEF DESCRIPTION OF THE DRAWINGS

A more complete understanding of the invention may be obtained by reference to the following Detailed Description and with reference to the accompanying drawings wherein.

DETAILED DESCRIPTION OF THE DRAWINGS

Figure 1:
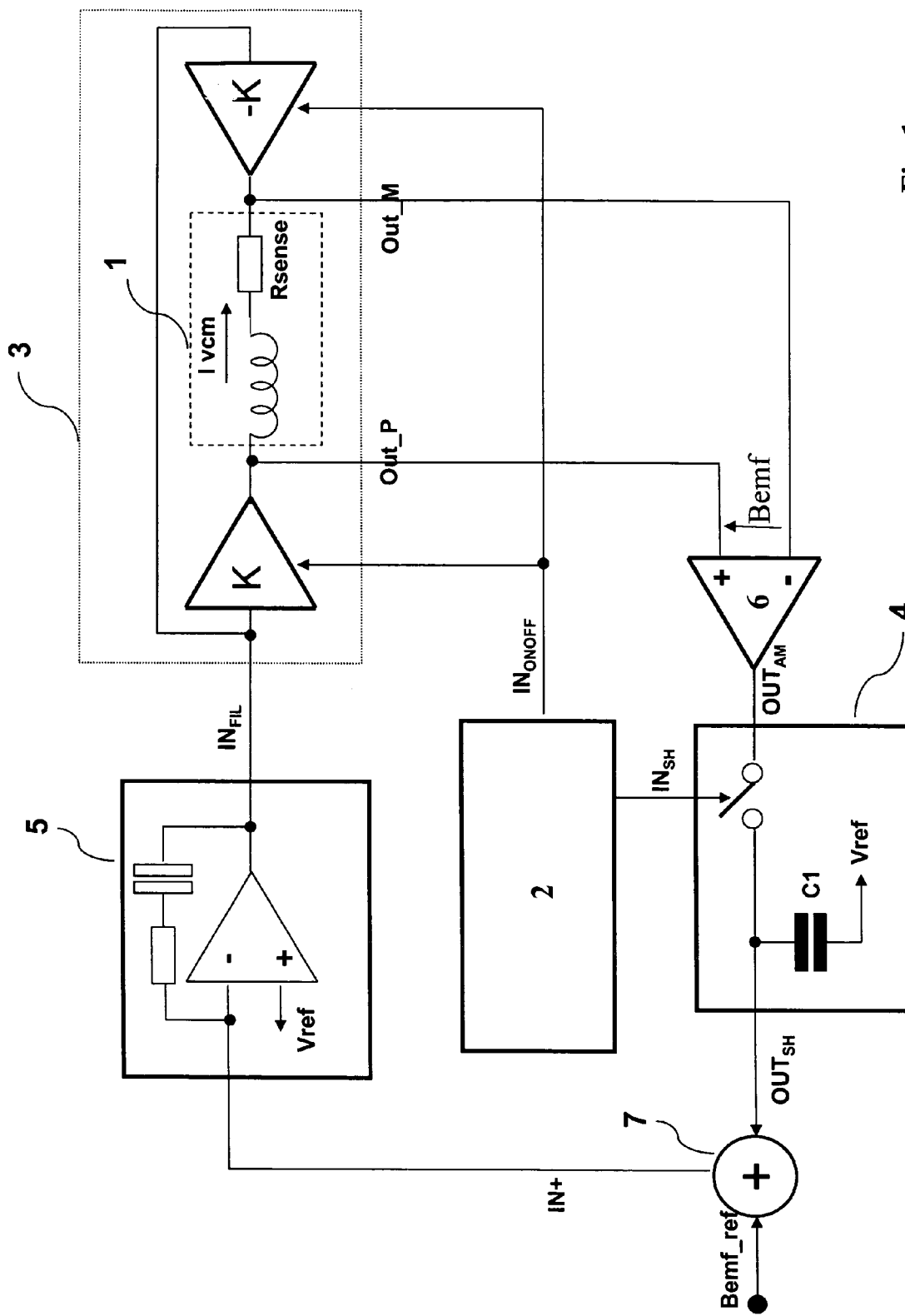
FIG. 1 schematically shows a system for controlling the speed of a VCM motor, according to the prior art.
Figure 2:
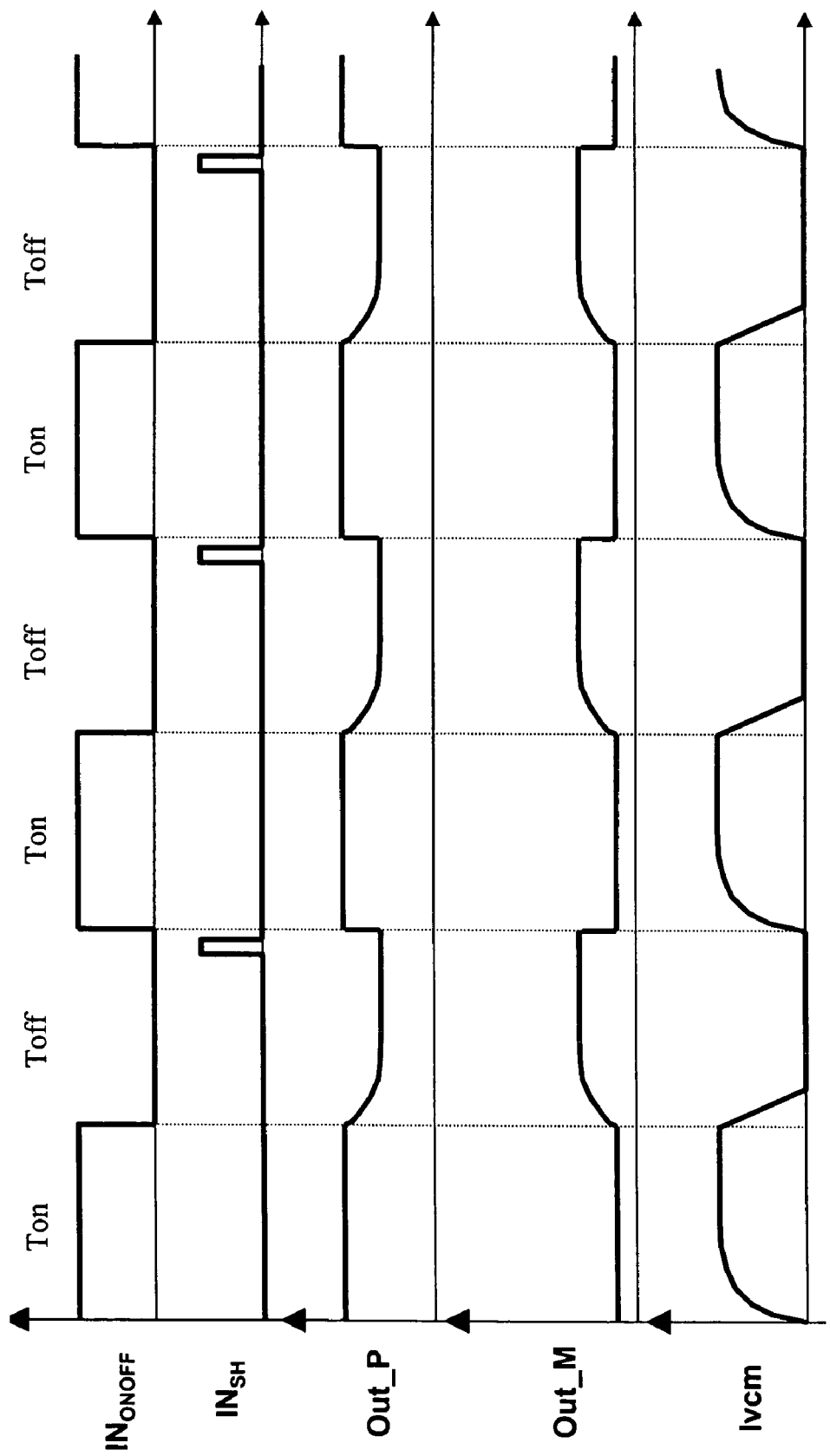
FIG. 2 is a timing diagram of signals and outputs related to the system shown in FIG. 1.
Figure 4:
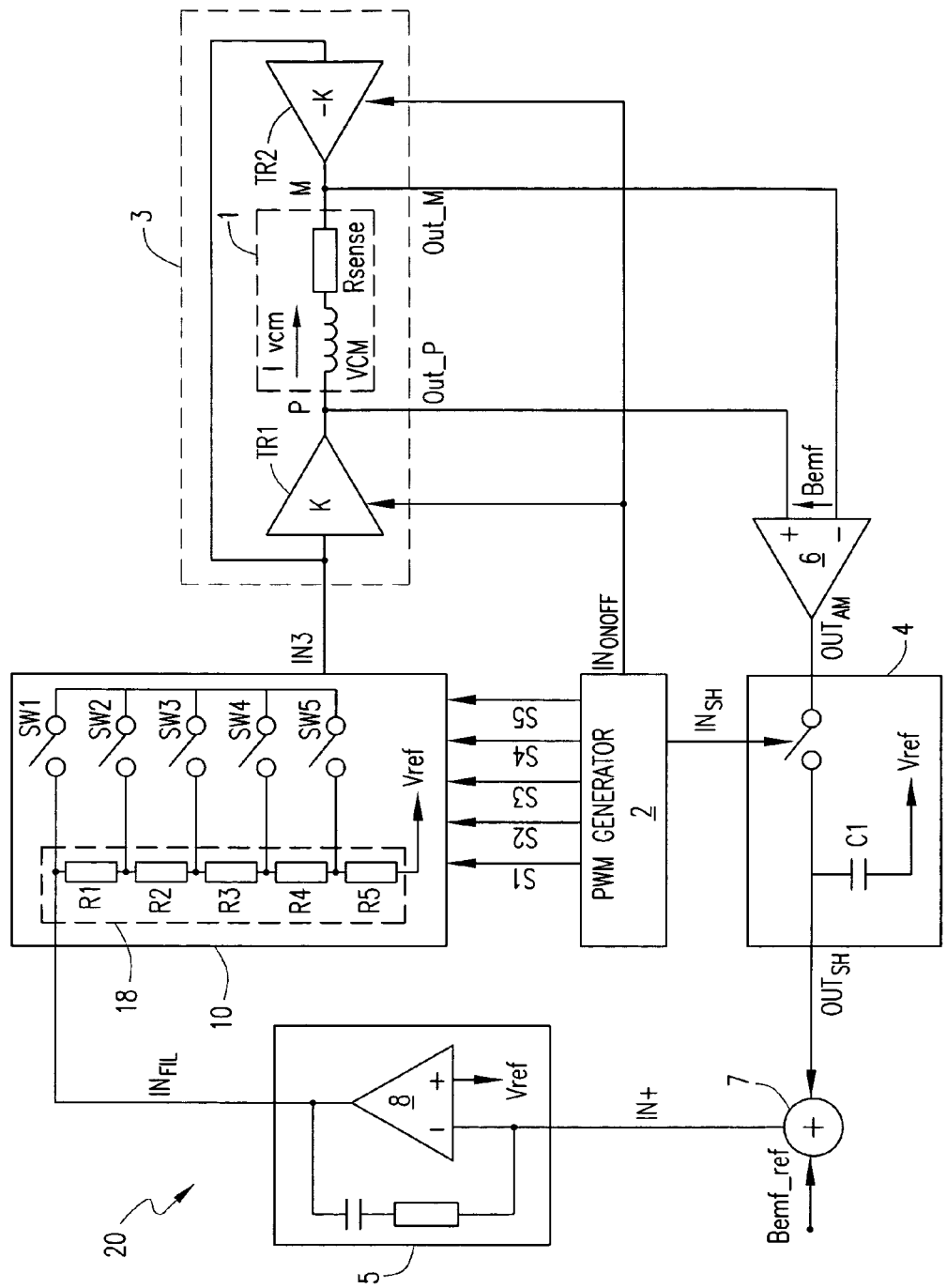
FIG. 4 schematically shows a system for controlling the speed of a VCM motor, according to this invention.

The description of a system for controlling the speed of a voice coil motor (VCM) by means of a power stage which is driven in a discontinuous PWM (Pulse Width Modulation) mode of operation is made in this specification for convenience of explanation only With reference to the drawings, in particular to the example of FIG. 4, a preferred embodiment of the inventive system is shown generally at 20 in a schematic form. Shown in FIG. 4 is a block diagram of a system for controlling the speed of a VCM motor. Components and signals shown in FIG. 1 and having the same construction to perform the same functions as in FIG. 1, are similarly referenced in FIG. 4.

The speed control system 20 comprises a generator 2 generating a discontinuous PWM signal. Like the prior art generator, the generator 2 generates a power-on signal $IN_{ONOFF}$ to enable a power stage 3, and a synchronization signal $IN_{SH}$ which is input to a sampling block 4 of the Sample and Hold type in order to synchronize the reading of an electromotive force Bemf from the VCM 1 with the frequency of the PWM signal from the generator 2.

As mentioned before in connection with the prior art, the system further comprises a power stage 3 which generates two drive signals Out_M and Out_P to the winding of the motor 1. These signals are also passed to the inverting (−) and non-inverting (+) terminals, respectively, of an operational amplifier 6 where the electromotive force Bemf is amplified (Bemf amplifier).

To control the speed of the VCM motor 1 during the operations for ramp loading the heads, the current $I_{VCM}$ is changed according to a deviation error which exists between a reference electromotive force Bemf_ref (representing the target speed of VCM 1) and the actual electromotive force Bemf as measured at the end of the cut-off time period (Toff) of VCM 1 and due to the movement of the VCM motor 1. The two electromotive forces are compared by means of an adder node 7.

This deviation error, indicated by the signal IN+, is suitably filtered through a filtering block 5, amplified and transmitted as a signal $IN_{FIL}$ which may be a filtered value of current.

Advantageously in this invention, a control block 10 is provided downstream of the filtering block 5 in the power supply of the power stage 3.

In particular, the control block 10 is arranged to act on the current profile during the VCM motor 1 enabling step.

This block 10 comprises a voltage divider 18 which comprises, for example, five resistors R1, R2, R3, R4, R5, in series to each other, the last resistor R5 being connected to a reference voltage value Vref. Each of the resistors R1, R2, R3, R4, R5 is associated with a respective controlled switch: SW1, SW2, SW3, SW4, SW5. These controlled switches are controlled by five signals S1, S2, S3, S4, S5 issued from the aforesaid generator block 2.

The resistance value of each resistor Ri (i=1 . . . 5) will set the value of the output signal IN3, upon its associated switch SWi (i=1 . . . 5) being closed, and therefore set the current profile to be applied each time to the VCM motor 1 during the whole enable period (Ton) of the same.

In other words, the output voltage $IN_{FIL}$ of the filtering block 5, which voltage sets the amplitude of the current $I_{VCM}$ flowing throughout the VCM motor 1, is advantageously partialized, according to the invention, by sequentially closing the switches SW1, SW2, SW3, SW4, SW5 in such a way to generate a voltage signal IN3 which is supplied to the power stage 3 and modulates the amplitude of the current $I_{VCM}$ and inhibits the VCM motor 1 from undergoing fast step-wise variations.

Advantageously in this invention, the number of control signals S and corresponding switches SW provided may vary to suit the resolution desired for the profile of the current $I_{VCM}$ during the power-on step of VCM motor 1.

By way of example only, the ideal current profile is here assumed to be a half-sinusoid. Advantageously, this profile may be changed and matched to the application such as to be optimized for maximum reduction of the acoustical noise produced by the current $I_{VCM}$ when controlled in the discontinuous PWM mode.

Thus, the generator 2 generates a plurality of output signals S1, S2, S3, S4, S5 to control the controlled switches SW1, SW2, SW3, SW4, SW5 to close. In this way, it is possible to control the profile of the current $I_{VCM}$ on the VCM motor winding during the enable period (Ton) of the motor itself.

Figure 5:
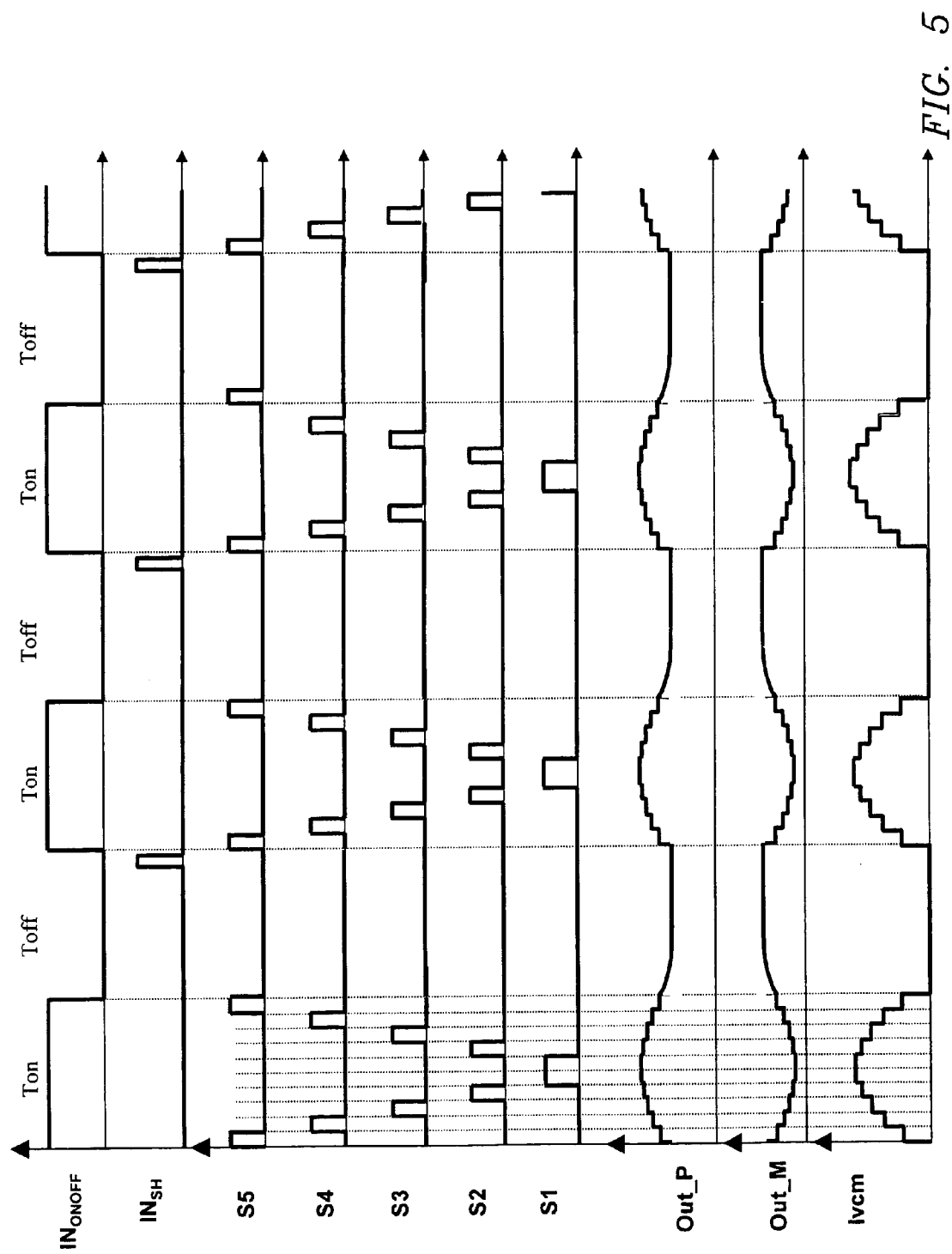
FIG. 5 is a timing diagram of signals and outputs related to the system shown in FIG. 4.

FIG. 5 shows a timing diagram that compares the power-on signal $IN_{ONOFF}$ and the synchronization signal $IN_{SH}$, also used in the prior art solutions, and the signals S1, S2, S3, S4, S5 which control the controlled switches SW1, SW2, SW3, SW4, SW5 to close synchronously with the discontinuous PWM signal.

As can be seen in FIG. 5, by having the current $I_{VCM}$ partialized through said switches, a current profile can be obtained which has a half-sinusoidal pattern, definitely better as to emitted acoustical noise than with the prior art systems referred to above.

Figure 3B:
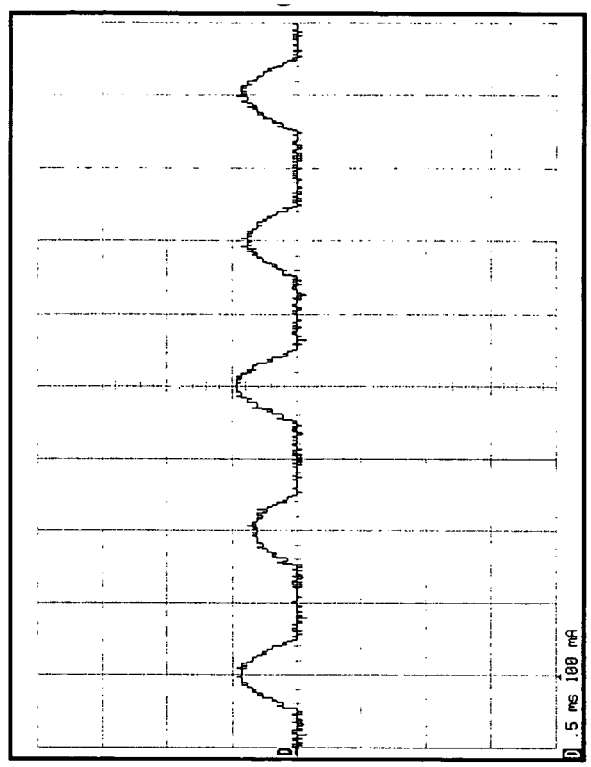
FIG. 3b shows the current profile of the VCM motor as generated in a system for controlling the speed of a VCM motor according to the invention.
Figure 3A:
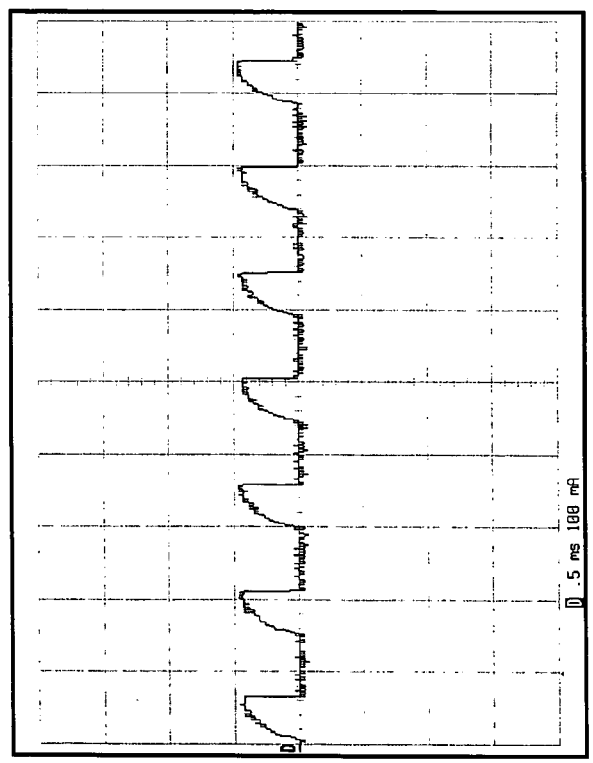
FIG. 3a shows the current profile of the VCM motor as generated in the system of FIG. 1.

FIG. 3b shows the profile of the current $I_{VCM}$ during the enable period (Ton) of the VCM motor 1, as provided by the system of the present invention. When compared to the prior art profile shown in FIG. 3a, the improvement in profile accuracy obtained by the inventive system is apparent.

Figure 6:
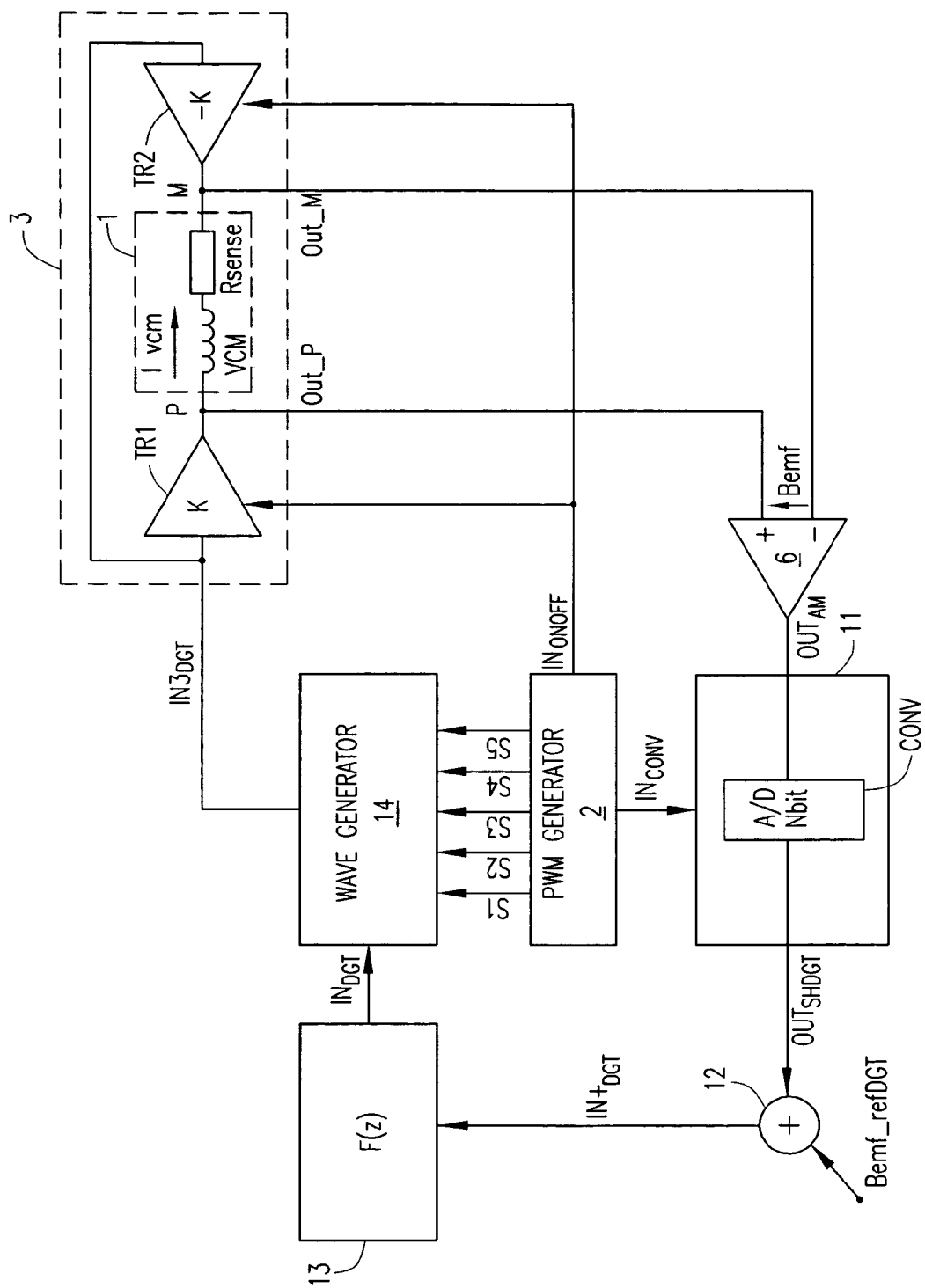
FIG. 6 schematically shows a digital embodiment of the system according to the invention.

FIG. 6 shows schematically a digital embodiment of the system according to the present invention. Once again, components and signals having the same construction and performing the same functions as in FIG. 4 are similarly referenced in FIG. 6.

Shown in FIG. 6 is a block diagram for the speed control of a VCM motor 1, wherein the power stage 3 operates according to the PWM mode and the current profile has been altered in order to obtain a digital implementation thereof.

This block diagram resembles that shown in FIG. 4 as concerns its analog portion. Same as in FIG. 4, there are discontinuous PWM signal generator 2, an output stage 3, and an operational amplifier 6, the latter to receive the signals Out_M and Out_P from the VCM motor 1 on expiration of a period Toff.

The generator 2 outputs a power-on signal $IN_{ONOFF}$ to enable the power stage 3 as previously discussed for the system of FIG. 4 and the prior art. It differs, however, from the previously mentioned designs by that it further generates five digital control signals S1, S2, S3, S4, S5 and a conversion start signal $IN_{CONV}$ effective to start an analog-to-digital conversion within a sampling block 11, also of the Sample and Hold type but having a digital output.

The electromotive force Bemf generated at the end of the VCM cut-off period Toff is sampled by an analog-to-digital converter CONV as activated by the signal $IN_{CONV}$ synchronously with the frequency of the signal $IN_{ONOFF}$ issued from the generator 2. A digital adder node 12 is input the signal $OUT_{SHDGT}$ and a digital reference value Bemf_refDGT, and outputs a compare digital value $IN+_{DGT}$ which supplies a digital filtering block 13. This block 13 issues an amplified digital signal $IN_{DGT}$ which is input to a PWM signal converting and waveform generating block 14.

The profile of the current $I_{VCM}$ during the enable period (Ton) of the VCM motor 1 is controlled within the PWM signal converting and waveform generating block 14, controlled by the signals S1, S2, S3, S4, S5.

Instead of controlling analog switches to close as in the embodiment of FIG. 4, in the digital embodiment of FIG. 6 these signals are directed to modulate the output duty cycle from the block 14 in such a way to obtain a modulation which produces a half-sinusoidal patterned current. A power supply signal $IN3_{DGT}$ is purposely produced in order to supply the power stage 3.

Figure 7:
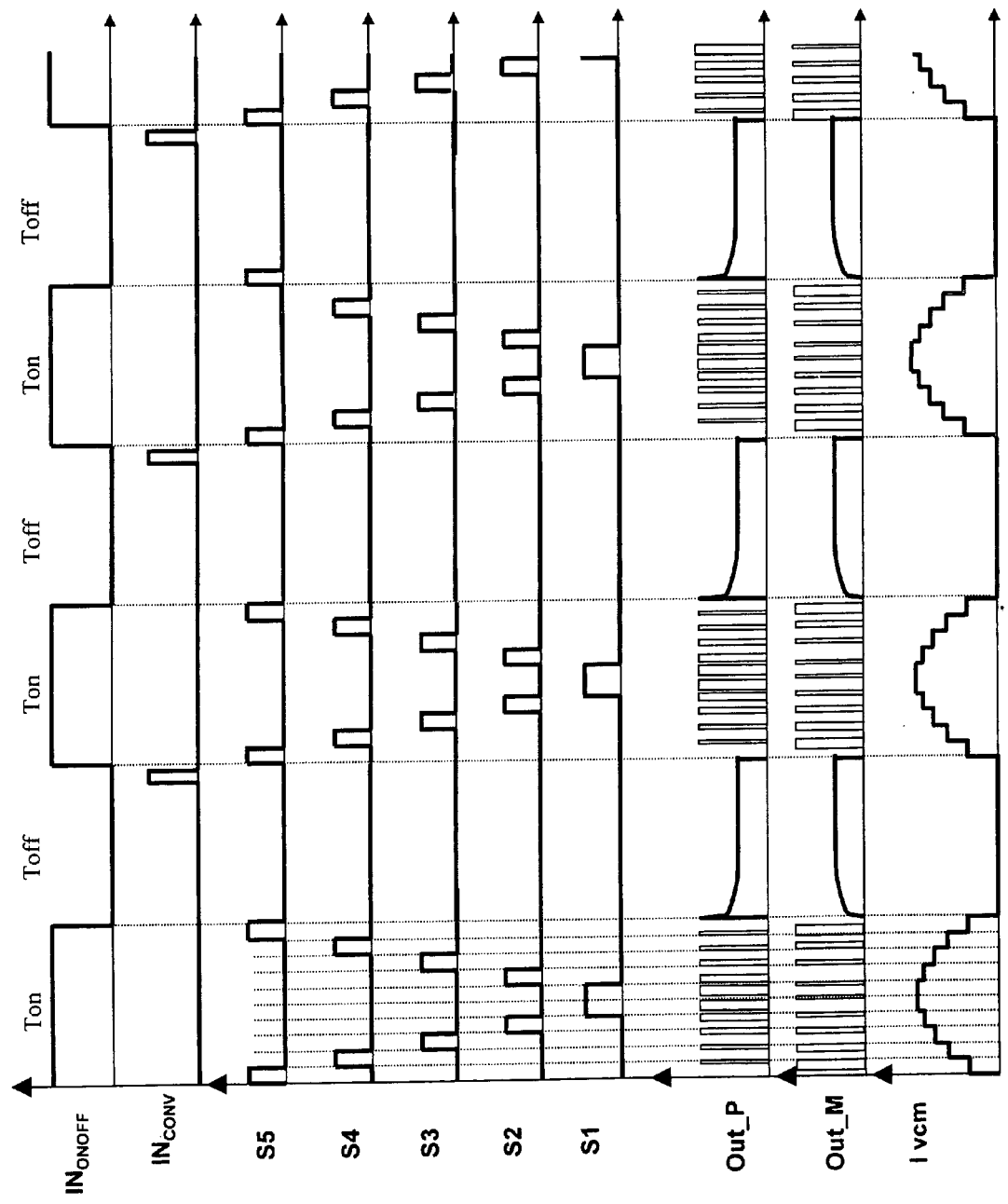
FIG. 7 is a timing diagram of signals and outputs related to the digital system of FIG. 6.

Shown in FIG. 7 is a timing diagram for the signals and outputs of the digital system in FIG. 6. It can be easily seen that, also according this embodiment, the profile of the current provided is definitely better as to emitted acoustical noise than that of the prior art systems referred to above.

To summarize, the present invention allows the current profile of a VCM motor to be controlled during its enable period (Ton), which motor is powered by a discontinuous mode PWM signal. As a result, the control provided effectively minimizes the emission of acoustical noise from the VCM motor.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for controlling the speed of a Voice Coil Motor (VCM) in order to perform the ramp loading of hard disk heads with low noise, the system comprising:
    a generator for generating a discontinuous PWM drive signal to a power stage including said VCM;
    a sampling block being clocked by a synchronization signal issued from said generator and receiving a signal related to an electromotive force (Bemf) provided by said VCM;
    an adder node placed at the sampling block output to add an output from said sampling block to a signal related to a reference electromotive force (Bemf_ref);
    a filtering block placed downstream of the adder node to receive an output from said adder node and generate a power supply voltage signal;
    a control block comprising at least one voltage divider and a plurality of controlled switches, said control block being input the voltage signal output from said filtering block and a plurality of control signals issued from said generator to selectively operate said controlled switches and set the value of the power supply signal value of said power stage.

2. The system according to claim 1, wherein said voltage divider is a resistive voltage divider, each resistor being associated with a respective controlled switch.

3. The system according to claim 1, wherein acoustical noise from the system is attenuated by controlling the power supply to the power stage, and therefore controlling the profile of a current of the winding of the VCM during an enable period of the power stage.

4. The system according to claim 3, wherein said current profile has a half-sinusoidal pattern.

5. The system according to claim 2, wherein the number of said controlled switches and said resistors grows with a resolution required for the profile of said current to be controlled.

6. The system according to claim 5, wherein the profile of said current to be controlled is matched to the application such that the system can operate at a low noise level.

7. The system according to claim 1, as embodied in a digital form, wherein the sampling block comprises an analog-to-digital converter, wherein the adder block is a digital adder node, wherein the filtering block is a digital filtering block, and wherein the control block is a PWM signal converting and waveform generating block.

8. The system according to claim 7, wherein said analog-to-digital converter in said sampling block converts an analog electromotive force value to a corresponding digital value upon being input a conversion start signal.

9. The system according to claim 7, wherein the profile of said current during the enable period of said VCM is controlled within said PWM signal converting and waveform generating block, as controlled by said control signals.

10. The system according to claim 9, wherein said control signals modulate the output duty cycle from said block to generate a current with a desired shape pattern.

11. A circuit for driving a voice coil motor, comprising:
a first drive amplifier connected to a first terminal of the voice coil motor;
a second drive amplifier connected to a second terminal of the voice coil motor, wherein the first and second drive amplifiers operate to supply a drive current through the voice coil motor; and
a supply circuit operable to supply a voltage signal to the first and second drive amplifiers such that an amplitude of the drive current through the voice coil motor has a profile that is substantially half-sinusoidal.

12. The circuit of claim 11 wherein the first amplifier has a positive gain characteristic and the second amplifier has a negative gain characteristic.

13. The circuit of claim 11 wherein the substantially half-sinusoidal profile of the drive current amplitude is a stepped function.

14. The circuit of claim 11 wherein the supply circuit comprises a voltage divider circuit including a plurality of taps, the voltage divider circuit receiving a voltage setting a maximum amplitude of the voltage signal, and further comprising a corresponding plurality of selectively actuated switches connected to the taps and having outputs connected to the first and second drive amplifiers.

15. The circuit of claim 14 wherein the supply circuit further comprises a signal generator operable to selectively actuate individual ones of the switches in such a manner as to shape the voltage signal applied to the first and second amplifiers.

16. The circuit of claim 15 wherein the voltage signal also has a substantially half-sinusoidal shape.

17. The circuit of claim 11 wherein the supply circuit generates the voltage signal applied to the first and second amplifiers to have a substantially half-sinusoidal shape.

18. A circuit for driving a voice coil motor, comprising:
a first drive amplifier connected to a first terminal of the voice coil motor;
a second drive amplifier connected to a second terminal of the voice coil motor, wherein the first and second drive amplifiers operate to supply a drive current through the voice coil motor; and
a supply circuit operable to supply a voltage signal to the first and second drive amplifiers such that an amplitude of the drive current through the voice coil motor has a profile that includes a curved rise time and a curved fall time.

19. The circuit of claim 18 wherein the first amplifier has a positive gain characteristic and the second amplifier has a negative gain characteristic.

20. The circuit of claim 18 wherein the curved rise time and curved fall time of the drive current amplitude is a stepped function.

21. The circuit of claim 18 wherein the supply circuit comprises a voltage divider circuit including a plurality of taps, the voltage divider circuit receiving a voltage setting a maximum amplitude of the voltage signal, and further comprising a corresponding plurality of selectively actuated switches connected to the taps and having outputs connected to the first and second drive amplifiers.

22. The circuit of claim 21 wherein the supply circuit further comprises a signal generator operable to selectively actuate individual ones of the switches in such a manner as to shape the voltage signal applied to the first and second amplifiers.

23. The circuit of claim 22 wherein the voltage signal also has a curved rise time and a curved fall time.

24. The circuit of claim 18 wherein the supply circuit generates the voltage signal applied to the first and second amplifiers to have a curved rise time and a curved fall time.

25. A system for driving a Voice Coil Motor (VCM) with low noise, comprising:
a power stage for the VCM which receives a voltage signal and generates a drive current through the VCM;
a control block including a voltage divider circuit and a plurality of controlled switches, the control block receiving a drive reference voltage and a plurality of switch control signals, the control block operable to selectively actuate the controlled switches so as to choose voltage taps of the voltage divider circuit and output the voltage signal to the power stage such that the drive current through the VCM has a noise reducing profile.

26. The system according to claim 25, wherein said voltage divider circuit is a resistive voltage divider circuit, each resistor being associated with a respective controlled switch.

27. The system according to claim 25, wherein the noise reducing profile has a substantially half-sinusoidal pattern.

28. The system according to claim 25, wherein the number of said controlled switches and voltage taps grows with a resolution required for the noise reducing profile of said drive current.

29. The system according to claim 25, wherein the control block is embodied in a digital form.

30. The system according to claim 25, wherein the noise reducing profile of said drive current has a curved rise time and a curved fall time.

* * * * *